United States Patent
Kageyama (10) Patent No.: US 10,539,945 B2
(45) Date of Patent: Jan. 21, 2020

(54) NUMERICAL CONTROLLER

(71) Applicant: FANUC CORPORATION, Minamitsuru-gun, Yamanashi (JP)

(72) Inventor: Yuuichi Kageyama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 26 days.

(21) Appl. No.: 15/865,715

(22) Filed: Jan. 9, 2018

(65) Prior Publication Data

US 2018/0203430 A1 Jul. 19, 2018

(30) Foreign Application Priority Data

Jan. 17, 2017 (JP) ................................ 2017-006085

(51) Int. Cl.
  *G05B 19/402* (2006.01)
(52) U.S. Cl.
  CPC .. *G05B 19/402* (2013.01); *G05B 2219/34017* (2013.01); *G05B 2219/35121* (2013.01); *G05B 2219/36177* (2013.01)
(58) Field of Classification Search
  CPC ........ G05B 19/402; G05B 2219/49061; G05B 2219/34093; G05B 2219/33099; G05B 2219/36177
  USPC ........................................ 700/159, 173, 184
  See application file for complete search history.

(56) References Cited

U.S. PATENT DOCUMENTS

| 5,608,641 A * | 3/1997 | Guhl ................. G05B 19/4093 318/568.1 |
| 2014/0163711 A1* | 6/2014 | Matsubara ............... G06K 9/00 700/103 |

FOREIGN PATENT DOCUMENTS

JP     H-04-33010 A    2/1992

* cited by examiner

*Primary Examiner* — Michael J Brown
(74) *Attorney, Agent, or Firm* — RatnerPrestia (57) ABSTRACT

In order to retrieve a specific block from a machining program, a numerical controller calculates the distance between a command path based on one of blocks included in the machining program and a current position of a tool and, based on the calculated distance, displays only that one of the blocks included in the machining program which is located closest to the current tool position or displays a plurality of blocks side by side in the ascending order of distance from the current tool position.

2 Claims, 6 Drawing Sheets

NUMERICAL CONTROLLER

CROSS-REFERENCE TO RELATED APPLICATIONS

This application is a new U.S. Patent Application that claims benefit of Japanese Patent Application No. 2017-006085, filed Jan. 17, 2017 the disclosure of this application is being incorporated herein by reference in its entirety for all purposes.

BACKGROUND OF THE INVENTION

Field of the Invention

The present invention relates to a numerical controller, and more particularly, to a numerical controller configured to retrieve blocks of a machining program from a machine position.

Description of the Related Art

If a tool is broken during machining using a numerical controller, the machining is interrupted so that the tool can be replaced, and thereafter, a block (e.g., a block for the interruption of the operation) in a machining program for the resumption of the operation is identified and the operation is resumed at the identified block, in some cases. Moreover, if a contaminated portion of a machined surface of a workpiece is found after the machining is performed by using the numerical controller, a block of the machining program for the machining of the machined surface may be identified so that machining conditions can be readjusted from the identified block for re-machining. Thus, in some machining using the numerical controller, a specific block of the machining program must be retrieved. In general, a program command value, tool number, sequence number and the like are used to retrieve a specific block from the machining program.

For example, Japanese Patent Application Laid-Open No. 04-033010 discloses, as a prior art for retrieving a specific block from a machining program, a method in which a tool path is drawn on a display screen in an interactive numerical controller, a mark is inserted into that point of the drawn tool path which is expected to be checked, and the block at the point to be checked is retrieved by using the mark.

If the machining program is long and there are a large number of similar tap commands or if similar machining commands exist in succession, however, there arises a problem that it takes time and labor to find out the specific block from graphics or the like of the machining program and machining path.

SUMMARY OF THE INVENTION

Accordingly, the object of the present invention is to provide a numerical controller capable of retrieving a target block from a machining program without taking time and labor.

According to the present invention, the above-described problem is solved by providing a numerical controller with a function for analyzing a machining program from the beginning and retrieving and identifying a block for machining in a position close to a current position of a tool, in resuming the machining in the middle of the machining program, for example. An operator can easily find out the block of the machining program for the resumption of the machining.

A numerical controller according to the present invention is configured to retrieve a specific block from a machining program and comprises a retrieval command input unit configured to accept the input of a retrieval command including information for identifying the machining program to be retrieved, a tool position acquisition unit configured to acquire a current position of a tool, a distance calculation unit configured to calculate the distance between a command path based on at least one of blocks included in the machining program and the current tool position acquired by the tool position acquisition unit, and a search result display unit configured to display at least one of the blocks included in the machining program in the ascending order of distance from the current tool position acquired by the tool position acquisition unit, based on the distance calculated by the distance calculation unit.

The distance calculation unit may be configured to calculate the distance between the command path based on the block and the current tool position acquired by the tool position acquisition unit, based on an interpolation position for each interpolation period of the block.

According to the present invention, the operator can designate the position by aligning the cutting edge of the tool with an actual workpiece, in commanding the retrieval of the block of the machining program, so that he/she can intuitively designate a target position. Moreover, the operator can easily identify a block corresponding to a disturbing portion of the machined surface, so that the labor for re-machining and the like can be reduced.

Furthermore, since the operator can easily identify the block of the machining program, working hours required for the modification of the machining program can be reduced.

DETAILED DESCRIPTION OF THE PREFERRED EMBODIMENTS

An embodiment of the present invention will now be described with reference to the accompanying drawings. First, an outline of a machining program search function mounted on a numerical controller of the present invention will be described with reference to FIGS. 1 to 4.

Figure 1:
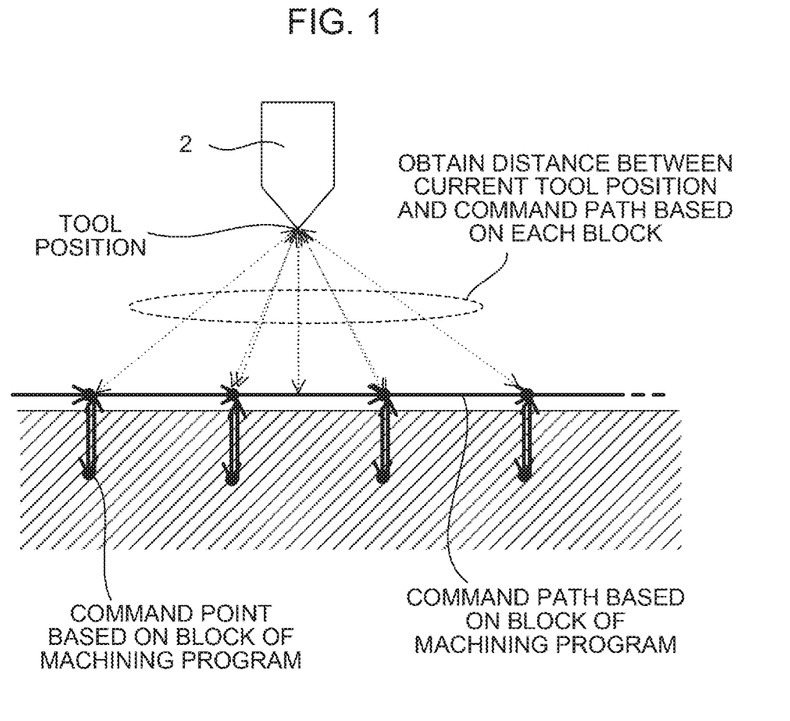
FIG. 1 is a diagram illustrating an outline of a machining program search function of a numerical controller according to one embodiment of the present invention.

In retrieving blocks of a machining program, as shown in FIG. 1, the numerical controller of the present invention calculates the distance between the current position of a tool and each of the blocks included in the machining program and retrieves a target block based on the calculated distance. In calculating the distance between the current tool position and each block of the machining program, the numerical controller of the present invention takes into consideration a tool correction amount of the currently selected (or mounted) tool in addition to the current coordinate value of the tool.

In retrieving the block of the machining program by means of the numerical controller of the present invention, an operator attaches tools and a workpiece to a machine controlled by the numerical controller, for example, selects one of the attached tools to be used for machining, aligns the cutting edge of the tool with a target position on the workpiece by manual feed or the like, and selects the machining program to be retrieved. Then, the operator commands the numerical controller to retrieve the block from the machining program. Thereupon, the numerical controller analyzes the machining program from the beginning, retrieves blocks located close to the current tool position, picks up the blocks in the ascending order of distance from the current tool position, and presents them to the operator.

The distance between the current tool position and the block of the machining program can be calculated by the following two methods. The numerical controller of the present invention calculates the distance between the current tool position and the block of the machining program using either of the following two calculation methods.

Calculation Method 1: This is a method in which the distance between the current tool position and the block is calculated by using a command path based on the block of the machining program (characterized by a short search time but with a large error in the case of a curved path).

Calculation Method 2: This is a method in which the distance between the current tool position and the block is calculated by using an interpolation position of the block (characterized by a long search time but with the capability of accurately calculating the distance between a complicated command path and the tool).

Figure 2:
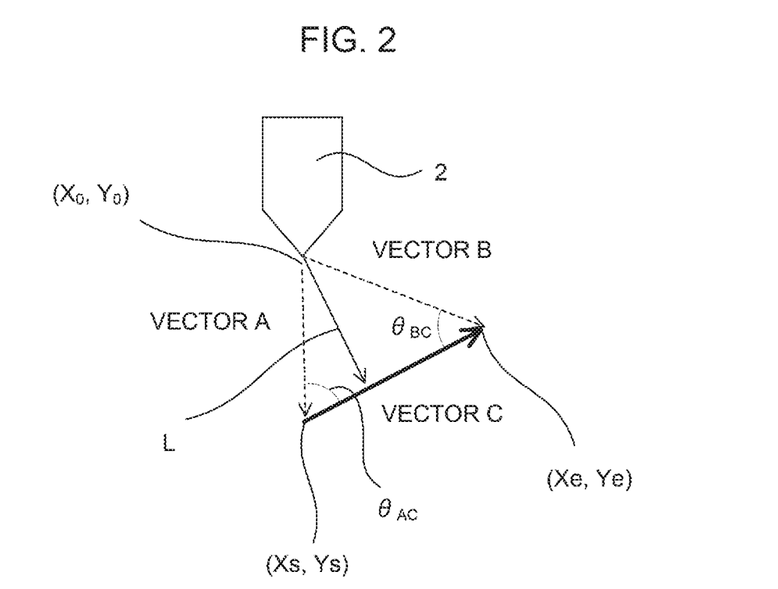
FIG. 2 is a diagram (1) illustrating a method for calculating the distance between a tool position and a block of the numerical controller according to the embodiment of the present invention.
Figure 3:
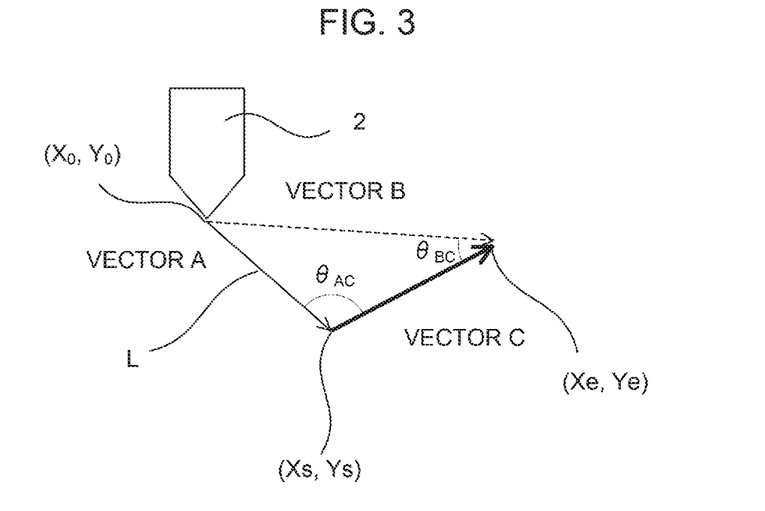
FIG. 3 is a diagram (2) illustrating a method for calculating the distance between the tool position and a block of the numerical controller according to the embodiment of the present invention.
Figure 4:
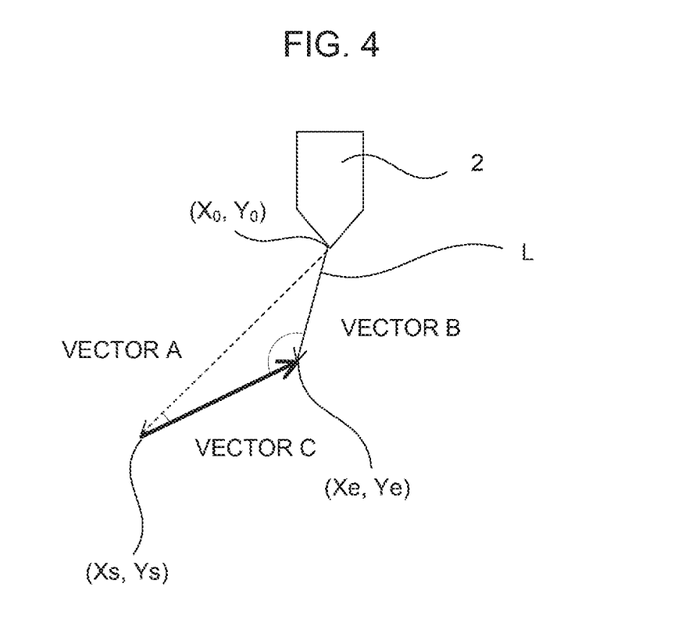
FIG. 4 is a diagram (3) illustrating a method for calculating the distance between the tool position and a block of the numerical controller according to the embodiment of the present invention.

FIGS. 2 to 4 are diagrams illustrating methods in which the distance between the current position of a tool 2 and the block of the machining program is calculated by using the start and end points of the block. Although the distance calculation methods shown in FIGS. 2 to 4 are described using a two-dimensional coordinate system for ease of description, the distance may actually be calculated using a three-dimensional coordinate system according to the range of operation of the machine.

The numerical controller of the present invention calculates a distance L between a tool position $(X_0, Y_0)$ and the block using the following equation (1) if the tool 2 is located in such a position that a line perpendicular to the command path based on the block subject to the distance calculation can be drawn, that is, if angles $\theta_{AC}$ and $\theta_{BC}$ between vectors A and C and between vectors B and C are both less than 90 degrees, where A is a vector from the tool position $(X_0, Y_0)$ to a start point (Xs, Ys) of the block, B is a vector from the tool position $(X_0, Y_0)$ to an end point (Xe, Ye) of the block, and C is a vector from the start point (Xs, Ys) to the end point (Xe, Ye) of the block, as shown in FIG. 2.

$$L = \frac{|(Ye - Ys)X_0 + (Xs - Xe)Y_0 + (XeYs - XsYe)|}{\sqrt{(Ye - Ys)^2 + (Xs - Xe)^2}} \quad (1)$$

The numerical controller of the present invention calculates the distance L between the tool position $(X_0, Y_0)$ and the block using the following equation (2) if the tool 2 is located on the start point side of the command path based on the block subject to the distance calculation, that is, if the angle $\theta_{AC}$ between the vectors A and C is not less than 90 degrees, where A is the vector from the tool position $(X_0, Y_0)$ to the start point (Xs, Ys) of the block, B is the vector from the tool position $(X_0, Y_0)$ to the end point (Xe, Ye) of the block, and C is the vector from the start point (Xs, Ys) to the end point (Xe, Ye) of the block, as shown in FIG. 3.

$$L = \sqrt{(Xs - X_0)^2 + (Ys - Y_0)^2} \quad (2)$$

The numerical controller of the present invention calculates the distance L between the tool position $(X_0, Y_0)$ and the block using the following equation (3) if the tool 2 is located on the end point side of the command path based on the block subject to the distance calculation, that is, if the angle $\theta_{BC}$ between the vectors B and C is not less than 90 degrees, where A is the vector from the tool position $(X_0, Y_0)$ to the start point (Xs, Ys) of the block, B is the vector from the tool position $(X_0, Y_0)$ to the end point (Xe, Ye) of the block, and C is the vector from the start point (Xs, Ys) to the end point (Xe, Ye) of the block, as shown in FIG. 4.

$$L = \sqrt{(X_0 - Xe)^2 + (Y_0 - Ye)^2} \quad (3)$$

Figures 5, 7:
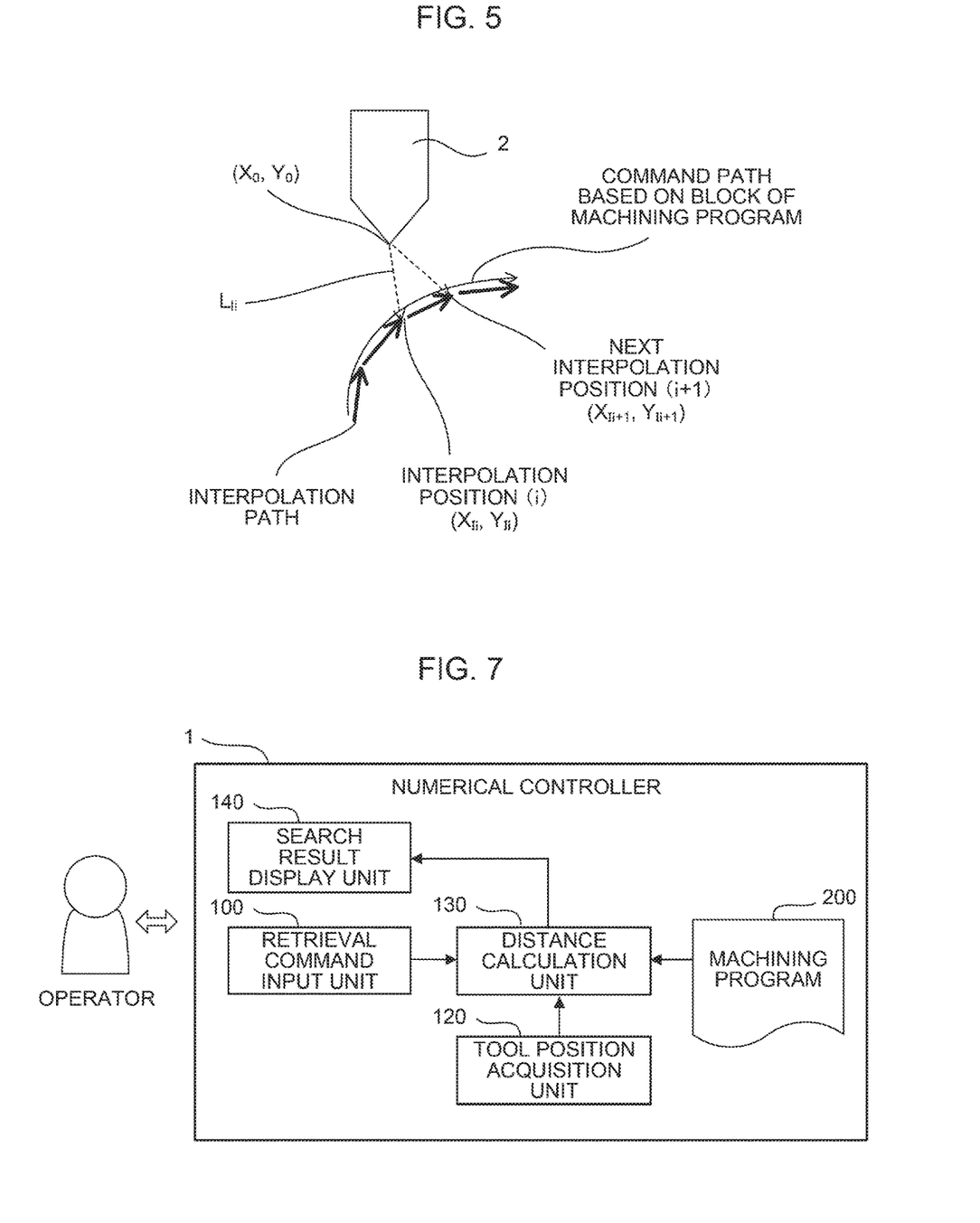
FIG. 5 is a diagram illustrating a method for calculating the distance between the tool position and a block of the numerical controller according to the embodiment of the present invention using an interpolation position of a command path.
FIG. 7 is a schematic functional block diagram of the numerical controller according to the embodiment of the present invention.

FIG. 5 is a diagram illustrating a method in which the distance between the current tool position and the block of the machining program is calculated by using the interpolation position of the block. Although the distance calculation method shown in FIG. 5 is described using a two-dimensional coordinate system for ease of description, the distance may actually be calculated using a three-dimensional coordinate system according to the range of operation of the machine.

In calculating the distance between the current position of the tool 2 and the block by using the interpolation position of the block of the machining program, the numerical controller of the present invention obtains a distance $L_{Ii}$ between an interpolation position (i) $(X_{Ii}, Y_{Ii})$ (i=0 to n) for each interpolation period in the block subject to the distance calculation and the tool position $(X_0, Y_0)$ using the following equation (4), as shown in FIG. 5.

$$L_{Ii} = \sqrt{(X_{Ii} - X_0)^2 + (Y_{Ii} - Y_0)^2} \quad (4)$$

The numerical controller of the present invention sets the shortest one of distances $L_{I1}$ to $L_{In}$ between the tool position $(X_0, Y_0)$ and the interpolation position (i) for each interpolation period in the block obtained in this manner as the distance between the block concerned and the current position of the tool 2.

In the case where the distance between the current position of the tool 2 and the block is calculated by using the interpolation position of the block of the machining program, the numerical controller of the present invention may calculate the distance with a necessary and sufficient interpolation period (e.g., several tens of ms) for the command speed of the machine without requiring interpolation processing with a fine interpolation period of, for example, several milliseconds (ms), which is required in actual machining. In this way, the search time can be reduced.

The following is a description of the configuration of a numerical controller according to one embodiment of the present invention.

Figure 6:
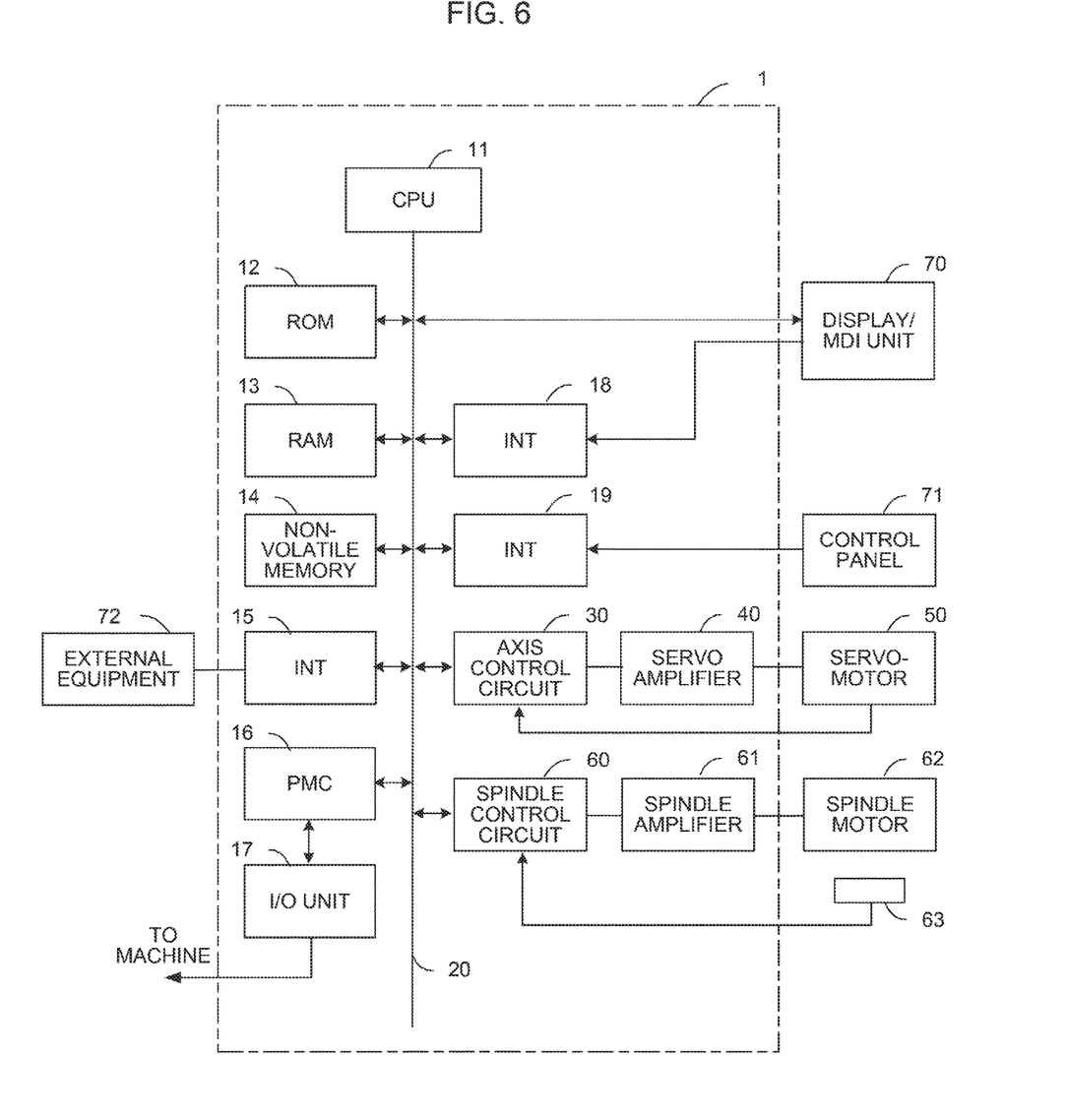
FIG. 6 is a schematic hardware configuration diagram of the numerical controller according to the embodiment of the present invention.

FIG. 6 is a hardware configuration diagram showing principal parts of the numerical controller according to the embodiment of the present invention and a finishing machine drivingly controlled by the numerical controller.

A CPU 11 of a numerical controller 1 is a processor for generally controlling the numerical controller 1. The CPU 11 reads out a system program in a ROM 12 through a bus 20 and generally controls the numerical controller 1 according to this system program. A RAM 13 is loaded with temporary calculation data and display data, various data input by an operator through a display/MDI unit 70 (described later), and the like.

A non-volatile memory 14 is constructed as a memory that is, for example, backed up by a battery (not shown) so that its storage state can be maintained even when the numerical controller 1 is turned off. The non-volatile memory 14 is stored with a machining program read in through an interface 15 and a machining program (described later) input through the display/MDI unit 70. While the non-volatile memory 14 is further stored with programs for machining program operation processing used to run the machining programs, these stored programs are expanded in the RAM 13 at the time of execution. Moreover, various system programs (including a system program for machining program retrieval) for performing edit mode processing and the like needed to create and edit the machining programs are previously written in the ROM 12.

The interface 15 is an interface for connecting the numerical controller 1 and external equipment 72 such as an adapter. The machining programs and various parameters are read in from the side of the external equipment 72. Moreover, the machining programs edited in the numerical controller 1 can be stored into an external storage means through the external equipment 72. A programmable machine controller (PMC) 16 controls peripheral devices (e.g., an actuator such as a robot hand for tool change) of the finishing machine by outputting signals to them through an I/O unit 17 according to a sequential program stored in the numerical controller 1. Furthermore, on receiving signals from various switches on a control panel on the main body of the finishing machine, the PMC 16 processes the signals as required and then delivers them to the CPU 11.

The display/MDI unit 70 is a manual data input unit equipped with a display, keyboard and the like. An interface 18 receives commands and data from the keyboard of the display/MDI unit 70 and delivers them to the CPU 11. An interface 19 is connected to a control panel 71 equipped with a manual pulse generator or the like that is used when axes are manually driven.

An axis control circuit 30 for controlling the axes of the finishing machine receives a move command amount of each axis from the CPU 11 and outputs a command for the axis to a servo amplifier 40. On receiving this command, the servo amplifier 40 drives a servomotor 50 for moving the axis of the finishing machine. The servomotor 50 for the axis has a position/speed detector built-in, and a position/speed feedback signal from this position/speed detector is fed back to the axis control circuit 30 to perform position/speed feedback control. In the hardware configuration diagram of FIG. 6, the axis control circuit 30, servo amplifier 40, and servomotor 50 are each shown as being only one in number. Actually, however, these elements are provided correspondingly in number to the axes of the finishing machine.

A spindle control circuit 60 receives a spindle rotation command for the finishing machine and outputs a spindle speed signal to a spindle amplifier 61. On receiving this spindle speed signal, the spindle amplifier 61 rotates a spindle motor 62 of the finishing machine at a commanded rotational speed, thereby driving the tool.

A position coder 63 is connected to the spindle motor 62. The position coder 63 outputs feedback pulses in synchronism with the rotation of a spindle and the feedback pulses are read by the CPU 11.

FIG. 7 is a schematic functional block diagram of the numerical controller according to the embodiment of the present invention for a case where the numerical controller 1 shown in FIG. 6 is mounted with a system program for implementing the above-described machining program search function. Each of function blocks shown in FIG. 7 can be implemented as the CPU 11 of the numerical controller 1 shown in FIG. 6 executes the system program for the machining program search function and controls the operation of each part of the numerical controller 1. The numerical controller 1 of the present embodiment comprises a retrieval command input unit 100, tool position acquisition unit 120, distance calculation unit 130, and search result display unit 140.

The retrieval command input unit 100 accepts a retrieval command of the block of the machining program from the operator through the display/MDI unit 70. The retrieval command accepted from the operator by the retrieval command input unit 100 includes at least information for identifying the machining program to be retrieved. The retrieval command accepted from the operator by the retrieval command input unit 100 may include information on the tool, such as a tool number and tool correction value, designation of the above-described method for calculating the distance between the current tool position and the block of the machining program, types of codes (fast-forward command, cutting feed, etc.) to be retrieved, and the like. The retrieval command accepted by the retrieval command input unit 100 is output to the distance calculation unit 130.

The tool position acquisition unit 120 acquires the current tool position and outputs it to the distance calculation unit 130. The tool position acquisition unit 120 may be configured to acquire the current tool position from the axis control circuit 30 or the like.

The distance calculation unit 130 reads out a machining program 200 identified by the retrieval command from the non-volatile memory 14 or the like and executes the above-described machining program search function, based on the read machining program 200, the current tool position acquired by the tool position acquisition unit 120, and retrieval conditions commanded by the retrieval command. If the retrieval command includes the tool number, tool correction value and the like as the retrieval conditions, the distance calculation unit 130 may be configured to correct the current tool position acquired by the tool position acquisition unit 120 by using the tool correction value of the tool identified by the tool number, tool correction value commanded directly by the retrieval command, or the like.

Moreover, if the method for calculating the distance between the current tool position and the block of the machining program is designated as a retrieval condition by the retrieval command, the distance calculation unit 130 calculates the distance between the current tool position and the block of the machining program using the designated calculation method. Furthermore, if the retrieval command includes the types of codes (fast-forward command, cutting feed, etc.) to be retrieved as retrieval conditions, the distance calculation unit 130 may be configured to restrict the types of the blocks of the machining program to be retrieved to the designated code types. The distance calculation unit 130 calculates the distance between the current tool position and each block and then outputs the calculated distance between the current tool position and each block to the search result display unit 140.

The search result display unit 140 displays the blocks of the machining program 200 on the display/MDI unit 70 in the ascending order of distance from the current tool position, based on the distance between the current tool position and each block accepted from the distance calculation unit 130. The search result display unit 140 may be configured either to display only the block located closest to the current tool position or to display a plurality of blocks side by side in the ascending order of distance from the current tool position. The search result display unit 140 may be configured either to display the block number of each block and a command for the block or to display each block so that several preceding and subsequent blocks can be ascertained. The search result display unit 140 may be configured not to display those blocks which are located at distances greater than a predetermined threshold from the current tool position.

Figure 8:
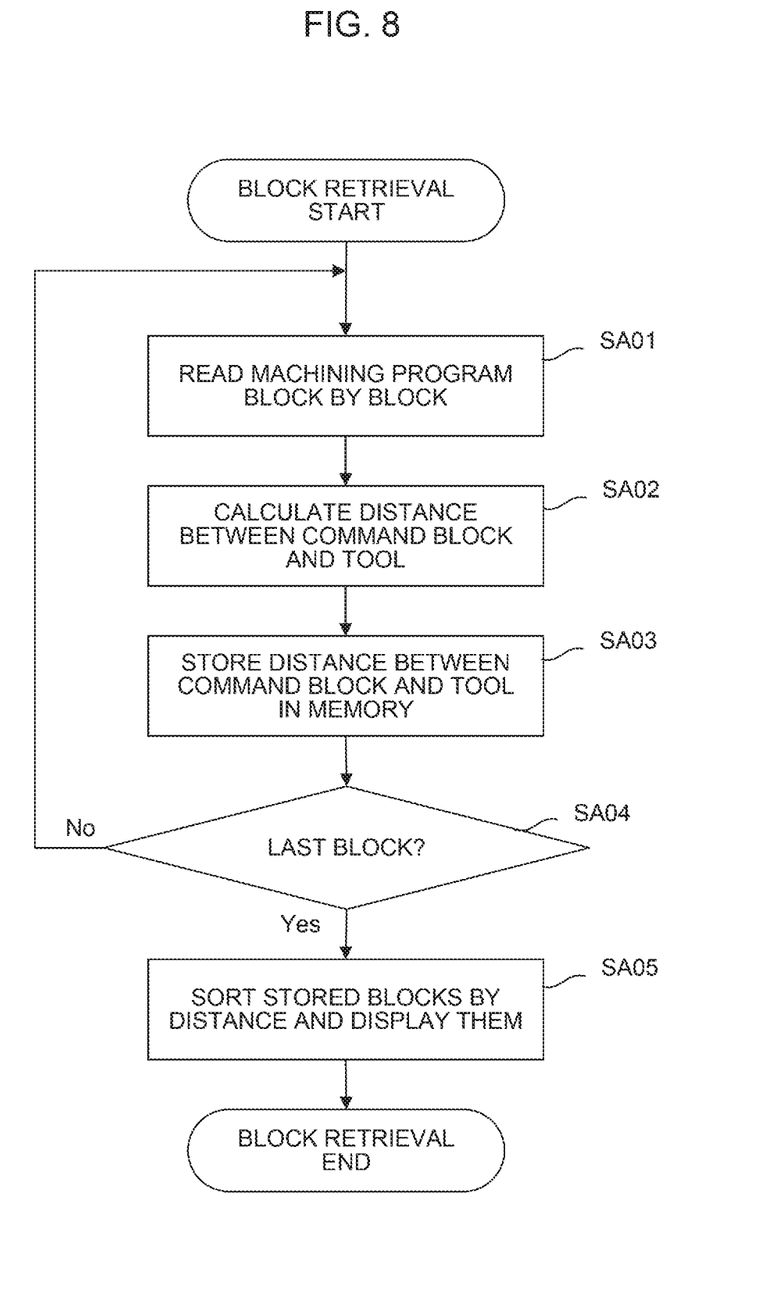
FIG. 8 is a flowchart showing processing for calculating the distance between the tool position and the block by the numerical controller shown in FIG. 7.

FIG. 8 is a flowchart showing machining program retrieval processing performed on the numerical controller 1. The processing is explained below according to respective steps.

[Step SA01] The distance calculation unit 130 reads out the machining program block by block from the non-volatile memory 14 or the like.

[Step SA02] The distance calculation unit 130 calculates the distance between the block read out in Step SA01 and the current tool position acquired by the tool position acquisition unit 120 by the above-described calculation method.

[Step SA03] The distance calculation unit 130 stores the distance between the block and the current tool position calculated in Step SA02 into a temporary storage area in the RAM 13 in association with the block concerned.

[Step SA04] The distance calculation unit 130 determines whether or not the block read out in Step SA01 is the last block of the machining program 200. If the read block is the last block, the processing proceeds to Step SA05. If not, the processing returns to Step SA01.

[Step SA05] The search result display unit 140 reads out the distance between each block and the current tool position from the temporary storage area in the RAM 13 and displays the blocks in the ascending order of distance.

Figure 9:
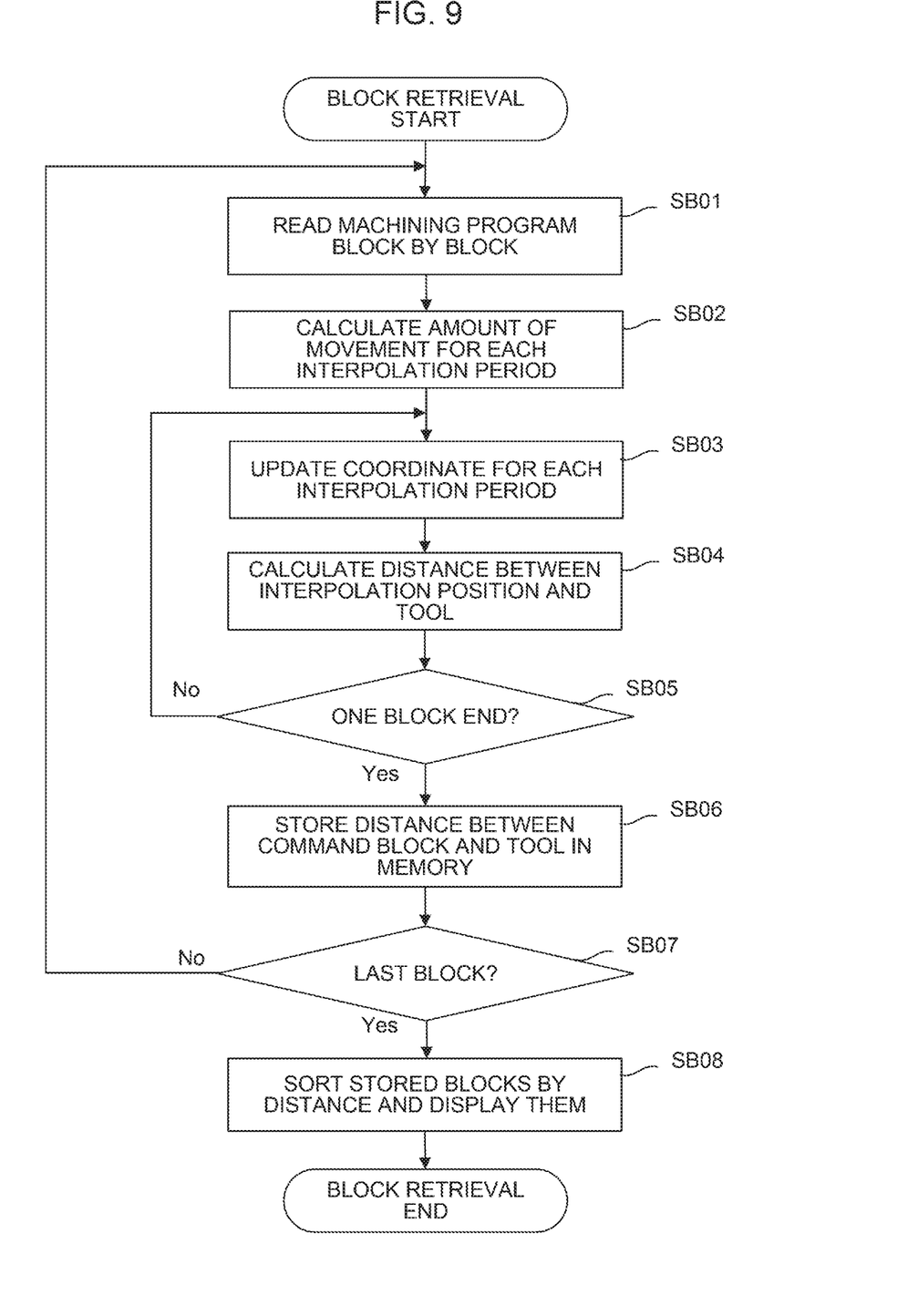
FIG. 9 is a flowchart showing processing for calculating the distance between the tool position and the block using the interpolation position of the command path by the numerical controller shown in FIG. 7.

FIG. 9 is a flowchart showing the machining program retrieval processing performed on the numerical controller 1 in the case where the distance between the current tool position and the block is calculated by using the interpolation position of the block. The processing is explained below according to respective steps.

[Step SB01] The distance calculation unit 130 reads out the machining program block by block from the non-volatile memory 14 or the like.

[Step SB02] The distance calculation unit 130 calculates an amount of movement for each interpolation period based on the block of the machining program read out in Step SB01.

[Step SB03] The distance calculation unit 130 calculates the interpolation position for the next interpolation period based on the movement amount for each interpolation period calculated in Step SB02 and updates the coordinate value to the calculated interpolation position.

[Step SB04] The distance calculation unit 130 calculates the distance between the interpolation position calculated in Step SB03 and the current tool position acquired by the tool position acquisition unit 120 and stores the calculated value in the temporary storage area in the RAM 13.

[Step SB05] The distance calculation unit 130 determines whether or not the distances from the tool for all the interpolation positions of the block are calculated. If the distances from the tool for all the interpolation positions are calculated, the processing proceeds to Step SB06. If not, the processing returns to Step SB03.

[Step SB06] The distance calculation unit 130 sets the shortest one of distances between the current tool position and interpolation positions for individual interpolation periods stored in Step SB04 as the distance between the block and the current position of the tool and stores the distance in the temporary storage area in the RAM 13 in association with the block concerned.

[Step SB07] The distance calculation unit 130 determines whether or not the block read out in Step SB01 is the last block of the machining program 200. If the read block is the last block, the processing proceeds to Step SB08. If not, the processing returns to Step SB01.

[Step SB08] The search result display unit 140 reads out the distance between each block and the current tool position from the temporary storage area in the RAM 13 and displays the blocks in the ascending order of distance.

The numerical controller of the present embodiment is applicable to the following situations.

<Resumption of Machining Operation>

If a machining operation of the machine is interrupted due to various circumstances (e.g., tool breakage) during the machining operation based on the machining program, the operator can retrieve the machining program block to be resumed at the tool position by using the machining program search function of the present invention in resuming the machining operation. Even in case where a position at which machining operation is to be resumed on a workpiece can be ascertained but the block of the program cannot be ascertained, the operator can easily retrieve the block to be resumed.

<Change of Machining Program>

If a contaminated portion of a machined surface produced due to the occurrence of chatter vibration or the like is found after the machining operation of the machine is mostly completed based on the machining program, the operator can easily identify the block of the machining program that implements the machining of the contaminated portion of the machined surface by using the machining program search function of the present invention after moving the tool to the contaminated portion of the machined surface. Moreover, the operator can clean the machined surface by reducing the feed rate of the identified block or taking some other measure. Furthermore, if one and the same portion is machined a plurality of times, e.g., by performing rough cutting, finishing, and chamfering in the order named, the operator can pick up all the steps of the machining of that portion and individually modify the steps.

While an embodiment of the present invention has been described herein, the invention is not limited to the above-described embodiment and may be suitably modified and embodied in various forms.

For example, in the embodiment described above, the blocks located close to the current tool position are assumed to be retrieved from the entire machining program. If the tool number or the like is designated (or selected) as a retrieval condition by the operator, however, the blocks within a range where a designated tool in the machining program is used may be narrowed down as objects of retrieval. In this way, the search time can be reduced, and moreover, the accuracy of the retrieval can be improved.

Furthermore, in connection with the above-described embodiment, the method for calculating the distance between the current tool position and the block by using the command path based on the block of the machining program is exemplified only for a straight-line command path. However, this method can also cope with a command path for which the distance from the current tool position can easily be geometrically calculated, as in the case of circular-arc interpolation, for example.

The invention claimed is:

1. A numerical controller configured to retrieve a specific block of a plurality of blocks from a machining program, the numerical controller comprising:
   a retrieval command input unit configured to accept the input of a retrieval command including information for identifying the machining program to be retrieved;
   a tool position acquisition unit configured to acquire a current position of a tool;
   a distance calculation unit configured to calculate the distance between a position of a command path of at least one of the plurality of blocks included in the machining program and the current tool position acquired by the tool position acquisition unit; and
   a search result display unit configured to display at least one of the plurality of blocks included in the machining program in the ascending order of, distance from the current tool position acquired by the tool position acquisition unit, based on the distance calculated by the distance calculation unit.

2. The numerical controller according to claim 1, wherein the distance calculation unit calculates the distance between the position of the command path based on the block and the current tool position acquired by the tool position acquisition unit, based on an interpolation position for each interpolation period of the block.

* * * * *